United States Patent [19]

Schmidle et al.

[11] 4,389,514

[45] Jun. 21, 1983

[54] ACCELERATED POLYMERIZATION OF ACRYLIC MONOMERS INITIATED BY DIALKYL AND DIARALKYL PEROXIDE FREE RADICAL GENERATORS IN THE PRESENCE OF TIN ACCELERATORS

[75] Inventors: Claude J. Schmidle, Trenton, N.J.; Seevaram N. Varadhachary, Newtown, Pa.

[73] Assignee: Congoleum Corporation, Kearny, N.J.

[21] Appl. No.: 327,864

[22] Filed: Dec. 7, 1981

Related U.S. Application Data

[63] Continuation of Ser. No. 191,201, Sep. 26, 1980, abandoned.

[51] Int. Cl.$^3$ .............................. C08F 8/42; C08F 4/76
[52] U.S. Cl. .................................... 525/364; 525/370; 526/184; 526/192
[58] Field of Search ................ 525/364, 370; 526/184, 526/192

[56] References Cited

U.S. PATENT DOCUMENTS

| | | | |
|---|---|---|---|
| 3,914,208 | 10/1975 | Carlos et al. | 260/86.1 E |
| 3,920,773 | 11/1975 | Pampus et al. | 260/94.7 HA |
| 4,187,131 | 2/1980 | Shortway et al. | 156/79 |
| 4,269,957 | 5/1981 | Gaylord et al. | 526/192 |

Primary Examiner—Joseph L. Schofer
Assistant Examiner—Bernard Lipman
Attorney, Agent, or Firm—Richard T. Laughlin; Walter Katz

[57] ABSTRACT

A method of increasing the reaction rate of the polymerization and/or cross-linking of reactive polymerizable and/or cross-linkable acrylic monomeric materials initiated by dialkyl or diaralkyl peroxides as the free radical generator which comprises carrying out such a polymerization and/or cross-linking reaction in the presence of a member of the group consisting of stannous alkanoates, alkenoates, aralkanoates and aralkenoates, dialkyl tin dialkanoates, dialkenoates, diaralkanoates and diaralkenoates, or mixtures thereof in various proportions.

14 Claims, No Drawings

ACCELERATED POLYMERIZATION OF ACRYLIC MONOMERS INITIATED BY DIALKYL AND DIARALKYL PEROXIDE FREE RADICAL GENERATORS IN THE PRESENCE OF TIN ACCELERATORS

This application is a continuation of application Ser. No. 191,201, filed Sept. 26, 1980, now abandoned.

THE FIELD OF THE INVENTION

The present invention relates to the polymerization and/or cross-linking of acrylic monomers initiated by dialkyl or diaralkyl peroxides as the free radical generators and to methods of increasing the reaction rates of such polymerizations and/or cross-linkings, whereby substantially complete polymerizations and/or cross-linkings can be obtained in much shorter periods of time.

THE GENERAL BACKGROUND OF THE INVENTION

Organic peroxides, notably dialkyl and diaralkyl peroxides, have been commonly used as free radical generators to initiate the polymerization and/or cross-linking of acrylic monomers. Such polymerizations and/or cross-linkings are frequently used in commercial and industrial plant procedures and operations and it has always been desired that such polymerizations and/or cross-linkings be expedited so that greater production rates can be realized for improved efficiencies and economies by providing shorter process-time requirements.

PURPOSES AND OBJECTS OF THE INVENTION

It is therefore a principal purpose and object of the present invention to provide for improved methods of polymerizing and/or cross-linking acrylic monomeric materials wherein the reaction rates of such polymerizations and/or cross-linking are increased and the production rates are raised, whereby improved efficiencies and economies are realized by shorter process-time requirements.

BRIEF SUMMARY OF THE INVENTION

It has been found that such principal purposes and objects, and other principal purposes and objects which will become clear from a further reading and understanding of this disclosure, may be accomplished by providing methods of increasing the reaction rates of the polymerization and/or cross-linking of reactive polymerizable and/or cross-linkable acrylic monomeric materials initiated by dialkyl or diaralkyl peroxides as the free radical generators which comprises carrying out such a polymerization and/or cross-linking reaction in the presence of a member of the group consisting of tin accelerators such as stannous alkanoates, alkenoates, aralkanoates, aralkenoates, dialkyl tin dialkanoates, dialkenoates, diaralkanoates, diaralkenoates, or mixtures thereof, in various proportions.

GENERAL DESCRIPTION OF THE INVENTION

The present invention will be described in a preferred and typical embodiment wherein two separate resinous layers are employed to contain all the essential constituents. The first of these two layers contains, among other constituents, the dialkyl or diaralkyl polymerization initiator peroxides, whereas the second of these two layers contains, among other constituents, the reactive polymerizable and/or cross-linkable acrylic monomeric materials as well as the tin accelerator. It is to be appreciated that all of these essential constituents could be contained in merely one layer and that such an embodiment could have far greater advantages in certain applications of the principles of the present invention.

THE FIRST RESINOUS LAYER

The first resinous layer may contain resins, plasticizers, pigments, dyes and colorants, solvents and diluents, blowing or foaming modifiers, fillers, wetting agents, and other additives and agents and is somewhat generally similar to the typical, standard and conventional foamable plastisols noted in Examples 1–11 of U.S. Pat. Nos. 3,293,094 and 3,293,108 which issued to Nairn et al. on Dec. 20, 1966. The first resinous layer, after being formed, may be firmed and gelled by heating at an elevated temperature of from about 290° F. to about 350° F. for a period of time of from about 1 minute to about 4 minutes so that it can be more easily handled and processed subsequently.

THE PRINTING INK COMPOSITION LAYER

A suitable printing ink composition is then applied to the gelled and firmed surface of the first resinous layer in the form of a desired or required predetermined pattern or design, usually of a number of various colors. The method of application of the printing ink composition is standard and conventional. The printing ink composition, with one notable exception to be discussed in greater detail hereinafter, is somewhat generally similar to the standard, typical and conventional printing ink compositions noted in Examples 18–36 of U.S. Pat. Nos. 3,293,094 and 3,293,108. However, there is also included in some or all of these printing ink compositions specified amounts of dialkyl or diaralkyl peroxides which are capable of generating free radicals which can initiate the polymerization and/or cross-linking of reactive polymerizable and/or cross-linkable acrylic monomeric materials. Such dialkyl and diaralkyl peroxides are included substantially uniformly in the printing ink composition in an amount of from about 1% by weight to about 40% by weight, based on the total weight of the selected printing ink composition.

THE DIALKYL AND DIARALKYL PEROXIDES

Typical commercially available dialkyl and diaralkyl peroxides which are utilizable within the principles of the present invention include, by way of illustration but not by way of limitation, the following:
Dicumyl peroxide
Di-t-butyl peroxide
Di-t-amy peroxide
2,5-dimethyl-2,5-bis(t-butylperoxy) hexane
2,5-dimethyl-2,5-bis(t-butylperoxy) hexyne-3
a,a'-Bis(t-butylperoxy) diisopropyl benzene
2,2-Bis(t-butylperoxy butane)
It is to be observed that, in the typical commercially available dialkyl and diaralkyl peroxides, the peroxy radical portion (—O—O—) is attached to a tertiary aliphatic carbon atom.

THE SECOND RESINOUS LAYER

The second resinous layer may contain resins, plasticizers, stabilizers, ultraviolet absorbers, toners, solvents and diluents, and other agents and additives and, with two notable exceptions, is somewhat generally similar to the typical and conventional wear layer compositions noted in Examples 12–15 of U.S. Pat. Nos. 3,293,094 and 3,203,108. However, there are also included in such second resinous layer two additional constituents, namely: (1) reactive polymerizable and/or cross-linkable acrylic monomeric materials; and (2) tin accelerators. The reactive polymerizable and/or cross-linkable acrylic monomeric materials are included substantially uniformly in the second resinous layer in an amount of from about 5% by weight to about 50% by weight, based on the total weight of the second resinous layer. The tin accelerator is included substantially uniformly in the second resinous layer in an amount of from about 0.1% by weight to about 9% by weight, based on the total weight of the second resinous layer.

THE REACTIVE POLYMERIZABLE AND CROSS-LINKABLE ACRYLIC MONOMERS

The particular reactive polymerizable and cross-linkable acrylic monomeric materials or mixtures thereof which are included in the second resinous layer do not relate to the essence of the present invention and substantially any reactive polymerizable and/or cross-linkable acrylic monomeric materials or mixtures thereof may be used. Preferred and typical of such monomeric materials are the following, as illustrative but not limitative examples:

Trimethylol propane trimethacrylate
Pentaerythritol tetamethacrylate
Glyceryl trimethacrylate
Pentaerythritol triacrylate
Neopentyl glycol diacrylate
Polyethylene glycol dimethacrylate
Tetraethylene glycol dimethacrylate
Ethylene glycol dimethacrylate
1,3-butylene glycol dimethacrylate
1,6-hexanediol dimethacrylate
Triethylene glycol dimethacrylate
Ethoxylated bis-phenol A dimethacrylate
Diethylene glycol dimethacrylate

THE TIN ACCELERATORS

The tin accelerators or mixtures thereof are members of the group consisting of stannous alkanoates, alkenoates, aralkanoates and aralkenoates, dialkyl tin dialkanoates, dialkenoates, diaralkanoates and diaralkenoates, and mixtures thereof in various proportions.

Typical and preferred of such tin accelerators are the following:

Stannous butanoate
Stannous octoate
Stannous hexanoate
Stannous heptanoate
Stannous linoleate
Stannous phenyl butanoate
Stannous phenyl stearate
Stannous phenyl oleate
Stannous nonanoate
Stannous decanoate
Stannous undecanoate
Stannous dodecanoate
Stannous stearate
Stannous oleate
Stannous undecenoate
Stannous 2-ethylhexoate
Dibutyl tin dilaurate
Dibutyl tin dioleate
Dibutyl tin distearate
Dipropyl tin dilaurate
Dipropyl tin dioleate
Dipropyl tin distearate
Dibutyl tin dihexanoate It is to be observed that these typical and preferred tin accelerators are tin derivatives of alkanoic, alkenoic, aralkanoic and aralkenoic acids containing from 4 carbon atoms to 18 carbon atoms.

The second resinous layer containing the reactive polymerizable and/or cross-linkable acrylic monomeric materials and the tin accelerator is formed or placed on the surface of the printed first resinous layer printed with the printing ink compositions containing the dialkyl or diaralkyl peroxides which act subsequently as polymerization and/or cross-linking initiators. Sufficient heat at an elevated temperature is then applied thereto to bring about such polymerization and/or cross-linking. Normally, the elevated temperatures required for such reactions are in the range of from about 260° F. to about 420° F. If pressure is applied simultaneously, such pressures may be in the range of from about 2 pounds per square inch gauge up to about 300 pounds per square inch gauge, and should be sufficient as to establish a firm and intimate contact between the pressure-applying means and the surface of the second resinous layer.

The length of time required for sufficient or substantially complete polymerization and/or cross-linking depends upon many factors, such as the particular reactive polymerizable and/or cross-linkable monomeric material used, the particular tin accelerator employed, the particular organic dialkyl or diaralkyl peroxide used, and so forth, and is usually a matter of seconds, the temperature also being a controlling factor. Naturally, given a particular set of conditions and materials, the shorter the time that is required, the more desirable is the operation, creating greater efficiencies and economies as a result of shorter process times and increased production or line speeds. During such heating procedures at such elevated temperatures, migration of the decomposition products of the organic dialkyl or diaralkyl peroxide polymerization initiator or catalyst takes place so that the polymerization and/or cross-linking of the reactive polymerizable and/or cross-linkable acrylic monomeric materials in the second resinous layer takes place, being initiated by the decomposition products of the organic dialkyl or diaralkyl peroxide and expedited and accelerated by the tin accelerator which is present in the second resinous layer.

MECHANICAL EMBOSSING

In the event that polymerized resinous polymer sheet materials are desired having selective surface decorative effects provided by contrasting flat, dead or dull mat finish areas and sleek, glossy or lustrous finish areas, mechanical embossing procedures, such as described in U.S. Pat. No. 4,187,131, may be employed. Such decorative effects may be obtained by means of properly applied pressure dies or similar tools which are suitably roughened, corrugated, contoured, knurled, lined or the like, which are pressed against the surface of the second resinous layer during the above-described heating and pressure operation. Such decorative surface effects may also be obtained by heating and pressing the surface of the second resinous layer against a surface such as a fibrous, grainy, or otherwise textured paper or paper product, or a woven or knitted fabric or the like, which surface is suitably backed-up or supported by a pressure and heat applying means.

SINGLE LAYER CONCEPTS

As mentioned briefly hereinbefore, it is not essential that the dialkyl or diaralkyl peroxides be maintained in one layer, such as the printing ink pattern or design layer and the reactive polymerizable acrylic monomeric materials and the tin accelerator be maintained in a separate layer, such as the second resinous layer, nor that such layers contain resinous materials. Such an arrangement provides for many desirable advantages but is not absolutely essential in all circumstances. All three of these constituents may be contained in a single layer and such a procedure also has many desirable advantages in other circumstances. In such an arrangement employing merely one layer, the dialkyl or diaralkyl peroxide polymerization initiator is present in an amount of from about 1% by weight to about 40% by weight, the reactive polymerizable acrylic monomeric materials are present in an amount of from about 5% by weight to about 50% by weight, and the tin accelerator is present in an amount of from about 0.1% by weight to about 9% by weight, all percentages being based on the total weight of the single layer. Additives and other agents, as mentioned hereinbefore, may also be included in the formulation of the single layer for specific purposes.

All the constituents of the single layer are mixed or blended substantially uniformly together and then heated to the desired elevated temperatures of from about 260° F. to about 420° F., at which time the desired reaction takes place under expedited and accelerated conditions, due to the presence of the tin accelerator. Polymerization and/or cross-linking of the reactive polymerizable acrylic monomeric materials proceeds at reaction rates of usually at least about 70% and up to 100% or more faster than similar or corresponding polymerization reactions which take place unaided by the addition of the tin accelerator.

The present invention will be further illustrated in greater detail by the following specific examples. It should be understood, however, that, although these specific examples may describe in very particular detail some of the more specific features, materials and procedures of the present invention, they are given primarily for the purpose of illustration and not of restriction and the present invention in its broader aspects should not be construed as limited thereto.

EXAMPLE I

A first resinous layer is formed comprising the following:

|  | Parts by Weight |
|---|---|
| Polyvinyl chloride, med. mol. wt., general purpose dispersion resin, inherent viscosity 0.99, ASTM D-1243-66 | 30.2 |
| Polyvinyl chloride, med. mol. wt., dispersion grade resin, inherent viscosity 1.0 | 8.2 |
| Polyvinyl chloride, med. mol. wt., blending resin, inherent viscosity 0.9 | 17.1 |
| Anhydrous alumina silicate filler | 6.9 |
| Butyl benzyl phthalate | 15.4 |
| Alkyl benzyl phthalate, low b. p. plasticizer | 9.1 |
| Polydodecyl benzene | 7.4 |
| Azodicarbonamide | 1.1 |
| Accelerator/stabilizer | 0.4 |
| Titanium dioxide | 2.5 |
| Dioctyl phthalate | 1.5 |

-continued

|  | Parts by Weight |
|---|---|
| Wetting agent | 0.1 |

This is a standard and conventional preferred, potentially foamable plastisol which is substantially uniformly formulated and is gelled and firmed in an oven maintained at an elevated temperature of about 300° F. with a gelling and firming time of about 3 minutes. The temperature is not that elevated as to activate or to decompose the azodicarbonamide blowing or foaming agent.

The gelled and firmed, potentially foamable plastisol is then printed in a desired or required pattern or design of many colors with the following printing ink compositions:

|  | Parts by Weight |
|---|---|
| Solution grade copolymer of vinyl chloride (90 parts) and Vinyl acetate | 15 |
| Methyl ethyl ketone | 85 |
| Pigment or colorant, as desired or required | |
| Solution grade copolymer of vinyl chloride-vinyl acetate (90/10) | 12 |
| Methyl ethyl ketone | 58 |
| Dicumyl peroxide (concentration 40%) | 15 |
| Trimellitic anhydride | 15 |
| Pigment or colorant, as desired or required | |

It is to be appreciated that those portions of the potentially foamable plastisol printed with the former printing ink composition do not have any polymerization initiator therein nor any blowing or foaming inhibitor, whereas those portions of the potentially foamable plastisol printed with the latter printing ink composition do have a polymerization initiator therein as well as a blowing or foaming inhibitor. One consequence of such selective printing will be a full and complete blowing, foaming and expansion of the former surface portions and a lesser and incomplete or decreased expansion of the latter surface portions, thus providing for the mortar and land areas of the resulting chemically embossed surfaces.

A second resinous layer is then formed on the printed, gelled first resinous layer to a depth of about 0.015 inch. The formulation of the second resinous layer is as follows:

|  | Parts by Weight |
|---|---|
| Polyvinyl chloride, low mol. wt., disp. grade, inh. vis. 0.8 | 100.0 |
| Di(2-ethylhexyl) phthalate plasticizer | 1.5 |
| Epoxidized soya oil | 2.7 |
| 2,2,4-trimethyl-1,3-pentanediol diisobutyrate | 3.7 |
| Butyl benzyl phthalate | 15.5 |
| Polydodecyl benzene | 4.6 |
| Trimethylol propane trimethacrylate | 25.0 |
| Stabilizers | 5.0 |
| Ultraviolet absorber | 0.4 |
| Violet toner | 0.3 |
| Stannous octoate | NONE |

Gelling and firming of the second resinous layer takes place at about 300° F. in a period of time of about 3 minutes. Continued heating in a Watson-Stillman press under a pressure of about 140 pounds per square inch gauge and an elevated temperature of about 310° F.

follows. Three separate samples are used: the first sample is pressed at the elevated temperature for 15 seconds; the second sample for about 20 seconds; and the third sample for about 25 seconds. Such temperatures are normally sufficient to bring about the polymerization of the trimethylol propane trimethacrylate, provided sufficient time for the reaction is given.

In no sample is there any evidence of cross-linking of the trimethylol propane trimethacrylate in the second resinous layer. Although the dicumyl peroxide polymerization initiator migrates into the second layer which contains the trimethylol propane trimethacrylate, the rate of reaction is so slow that there is no substantial cross-linking at the end of the 15, 20 and 25 second periods.

It is therefore to be concluded that, under such normal polymerizing conditions and in the absence of any stannous octoate or other tin accelerator, the polymerization and/or cross-linking reaction does not proceed to any marked degree.

EXAMPLE II

The procedures described in Example I are followed substantially as set forth therein with the exception that stannous octoate is now included in the formulation in an amount of about 3 parts. Three samples are again used and again the time periods are 15 seconds, 20 seconds and 25 seconds. There is little evidence of any cross-linking in the 15 second sample but there is ample evidence of polymerization and/or cross-linking in the 20 second and 25 second samples. The increase in the reaction rate of the polymerization and/or cross-linking of the trimethylol propane trimethacrylate is due to the presence of the stannous octoate tin accelerator.

EXAMPLE III

During a full scale plane production run involving the polymerization and/or cross-linking of trimethylol propane trimethacrylate as brought about by a dicumyl peroxide polymerization initiator, the best manufacturing speed is a production rate of about 10 feet per minute of product, following the procedures of Example I, wherein no tin accelerator is used.

Following the procedures of Example II, wherein 3 parts of tin accelerator is used in the formulation of the second resinous layer, the manufacturing speed is improved by an increase in the production rate to about 17 feet per minute. This is an improvement of about 70%.

EXAMPLE IV

The procedures described in Example I and II are followed substantially as set forth therein, replacing the trimethylol propane trimethacrylate with the following monomeric acrylic materials:
Example IV-A. Pentaerythritol tetramethacrylate
Example IV-B. Glyceryl trimethacrylate
Example IV-C. Pentaerythritol triacrylate
Example IV-D. Neopentyl glycol diacrylate
Example IV-E. Polyethylene glycol dimethacrylate
The results of all these Examples are generally comparable to the results obtained in Examples I and II. The reaction rates of the polymerization and/or cross-linking of the reactive polymerizable acrylic monomeric materials is substantially increased in the presence of the stannous octoate tin accelerator.

EXAMPLE V

The procedures described in Examples I and II are followed substantially as set forth therein, replacing the dicumyl peroxide polymerization initiator with the following polymerization initiators:
Example V-A. Di-t-butyl peroxide
Example V-B. Di-t-amyl peroxide
Example V-C. 2,5-dimethyl-2,5-bis-(t-butyl peroxy) hexane
Example V-D. 2,5-dimethyl-2,5-bis-(t-butyl peroxy) hexyne-3
The results of all these Examples are generally comparable to the results obtained in Examples I and II. The polymerization and/or cross-linking of the trimethylol propane trimethacrylate is at an increased rate in the presence of the stannous octoate tin accelerator.

EXAMPLE VI

The procedures described in Examples I and II are followed substantially as set forth therein, with the exception that the stannous octoate tin accelerator is replaced by the following tin accelerators:
Example VI-A. Stannous oleate
Example VI-B. Stannous phenyl stearate
Example VI-C. Stannous phenyl butanoate
Example VI-D. Stannous undecanoate
Example VI-E. Stannous butanoate
Example VI-F. Stannous 2-ethylhexanoate
Example VI-G. Stannous hexanoate
Example VI-H. Dibutyl tin dilaurate
Example VI-I. Dibutyl tin dioleate
Example VI-J. Dipropyl tin dilaurate
Example VI-K. Dipropyl tin dioleate
The results of all these Examples are generally comparable to the results obtained in Examples I and II. The polymerization and/or cross-linking of the trimethylol propane trimethacrylate proceeds at a much faster rate in the presence of the particular tin accelerator.

EXAMPLES VII AND VIII

The procedures described in Examples I and II are followed substantially as set forth therein with the exception that the amount of the stannous octoate is increased from the 3 parts used in Example II to the following amounts:
Example VII. 5 parts
Example VIII. 15 parts
The results of these Examples VII and VIII are generally comparable to the results obtained in Examples I and II. The reaction rates of the polymerization and cross-linking of the trimethylol propane trimethacrylate are increased when in the presence of the tin accelerator.

EXAMPLE IX

Resinous polymer decorative sheet materials having contrasting flat, dead or dull mat finish areas and sleek, glossy or lustrous finish areas, such as described and illustrated in U.S. Pat. No. 4,187,131, are obtained by: (A) using the procedures described in Example I of that patent (no tin accelerator); (B) using stannous nonanoate as the tin accelerator; and (C) using dibutyl tin dilaurate as the tin accelerator in the preparation of three separate samples.

The accelerating effect of a selected tin accelerator on the rates of the polymerization and/or cross-linking of the trimethylol propane trimethacrylate as initiated by the dicumyl peroxide polymerization initiator is evaluated as follows:

A typical, standard and conventional potentially foamable gel (see U.S. Pat. No. 4,187,131 Example I, no tin accelerator) is printed with a printing ink composition in a predetermined pattern or design of several colors of lands (to be raised) and mortars (to be relatively lowered). The mortar portions of the printed pattern or design contain trimellitic anhydride and dicumyl peroxide. The printing ink composition layer is allowed to air dry.

The printed, potentially foamable gel is then coated with a conventional typical and standard vinyl wear layer to a depth of about 5 mils and the vinyl wear layer is gelled and firmed by conventional procedures by heating in an oven for about 3 minutes at a temperature of about 300° F. On top of the gelled and firmed vinyl wear layer is substantially uniformly containing trimethylol propane trimethacrylate (see U.S. Pat. No. 4,187,131) which is subsequently gelled and firmed at about 300° F. for about 3 minutes.

A textured-surface, dull mat release paper is then placed on top of the gelled and firmed acrylic wear layer and substantially uniform pressure is applied thereto under elevated temperatures in a Watson-Stillman press in which the top platen has a temperature of about 350° F. and the applied pressure is about 25 pounds per square inch gauge. Pressure is applied equally to the three separate, differently formulated samples for periods of time of 10, 15, 15+, 20 and 35 seconds, after which the textured-surface dull mat release papers are removed from the surfaces of the three samples. Blowing, foaming and fusing of the three samples take place in an oven maintained at a temperature of about 430° F. (2 minutes, 5 seconds) and the various samples are identified and evaluated as follows:

| Time | No Tin Accelerator | Stannous Nonanoate | Dibutyl Tin Dilaurate |
|---|---|---|---|
| 10 seconds | No Effect | No Effect | No Effect |
| 15 seconds | No Effect | Moderate | No Effect |
| 15+ seconds | No Effect | Moderate | Moderate |
| 20 seconds | No Effect | Good | Good |
| 35 seconds | Good | Good | Good |

These results clearly indicate the accelerating effect of the tin accelerator on the polymerizing and/or cross-linking of the acrylic monomeric materials in the acrylic wear layer as initiated by the dicumyl peroxide polymerization initiator, whereby processing procedures can be accelerated and production and manufacturing times can be reduced materially.

EXAMPLE X

The procedures described in Example II are followed substantially as set forth therein with the exception that a very thin vinyl barrier coat is applied over the printed, gelled, potentially foamable plastisol (first resinous layer) prior to the application of the second resinous layer. The barrier coat has the following composition:

| | Parts by Weight |
|---|---|
| Polyvinyl chloride, high mol. wt., dispersion resin, inherent viscosity 1.4 | 89.4 |
| Polyvinyl chloride, high mol. wt., blending resin, inherent viscosity 0.9 | 10.6 |

| | Parts by Weight |
|---|---|
| Epoxidized soya oil | 5.0 |
| Butyl benzyl phthalate | 28.9 |
| 2,2,4-trimethyl-1,3-pentanediol diisobutyrate | 6.9 |
| Polydodecyl benzene | 9.2 |
| Stabilizers | 7.2 |
| Violet toner | 0.2 |
| Ultraviolet absorber | 0.3 |

Such a barrier coat is effective in preventing any gases developed or liberated during the subsequent blowing or foaming procedure from tending to escape upwardly and possibly undesirably affect the smoothness and the evenness of the top surface of the final product. Insofar as the effect of any tin accelerator on the rapidity of the polymerization and/or cross-linking of the reactive polymerizable and/or cross-linkable acrylic monomeric materials is concerned, the results are generally comparable to the results obtained in Example II.

Although several specific examples of the inventive concept have been described, the invention should not be construed as limited thereby nor to the specific features, materials or procedures mentioned therein but to include other equivalent features, materials and procedures as set forth and covered by the scope and the spirit of the claims appended hereto. It is understood that any suitable or appropriate changes, modifications, and variations may be made without departing from the spirit and scope of the invention.

What is claimed is:

1. In a method for increasing the reaction rate of the polymerization and/or cross-linking of reactive polymerizable and/or cross linkable acrylic monomeric materials initiated by dialkyl or diaralkyl peroxides as the free radical generator, the improvement which comprises carrying out such polymerization and/or cross-linking reaction in the presence of from at least 0.1 to about 9% by weight, of a stannous accelerator from the group consisting of stannous alkanoates, alkenoates, aralkanoates and aralkenoates, dialkyl stannous dialknoates, dialkenoates, diaralkanoates and diaralkenoates, and mixtures thereof.

2. A method as defined in claim 1, wherein said dialkyl or diaralkyl peroxide is present in a first layer and said reactive polymerizable and/or cross-linkable acrylic monomeric material and said tin accelerator are present in a second layer, prior to the initiation of the polymerization and/or cross-linking of the reactive polymerizable and/or cross-linkable acrylic monomeric material.

3. A method as defined in claim 2, wherein said dialkyl or diaralkyl peroxide is included only in portions of a predetermined pattern or design in said first layer.

4. A method as defined in claim 2, wherein said reactive polymerizable and/or cross-linkable acrylic monomeric material and said tin accelerator are included substantially uniformly in said second layer.

5. A method as defined in claim 1, wherein said dialkyl or diaralkyl peroxide, said reactive polymerizable and/or cross-linkable acrylic monomeric material and said tin accelerator are present in one layer, prior to the initiation of the polymerization and/or cross-linking of the reactive polymerizable and/or cross-linkable acrylic monomeric materials.

6. A method as defined in claim 1, wherein said tin accelerator is stannous octoate or stannous nonanoate.

7. A method as defined in claim 1, wherein said polymerization is carried out at a temperature of about 260° to 420° F. with a composition comprising about 5 to 50% by weight of said acrylic monomeric materials and about 1 to 40% by weight of said dialkyl or diaralkyl peroxide.

8. A method as defined in claim 1, wherein said tin accelerator is dibutyl tin dilaurate.

9. A method as defined in claim 1, wherein said dialkyl or diaralkyl peroxide is dicumyl peroxide.

10. A method as defined in claim 1, wherein said dialkyl or diaralkyl peroxide is di-t-butyl peroxide.

11. A method as defined in claim 1, wherein said dialkyl or diaralkyl peroxide is di-t-amyl peroxide.

12. A method as defined in claim 1, wherein said reactive polymerizable and/or cross-linkable acrylic monomeric material is trimethylol propane trimethacrylate.

13. A method as defined in claim 1, wherein said reactive polymerizable and/or cross-linkable acrylic monomeric material is pentaerythritol tetramethacrylate.

14. A method as defined in claim 3, for producing a product having dull areas on its surface which includes the step of carrying out said polymerization in contact with a dull or textured surface whereby said dull appearance is retained in areas where the dialkyl or diaralkyl peroxide is present after said polymerization is completed.

* * * * *